United States Patent
Finkelstein

(10) Patent No.: US 11,290,247 B2
(45) Date of Patent: Mar. 29, 2022

(54) SYSTEMS AND METHODS FOR NON-ORTHOGONAL MULTIPLE ACCESS OVER NETWORKS

(71) Applicant: Cox Communications, Inc., Atlanta, GA (US)

(72) Inventor: Jeffrey L. Finkelstein, Atlanta, GA (US)

(73) Assignee: Cox Communications, Inc., Atlanta, GA (US)

(*) Notice: Subject to any disclaimer, the term of this patent is extended or adjusted under 35 U.S.C. 154(b) by 197 days.

(21) Appl. No.: 16/263,554

(22) Filed: Jan. 31, 2019

(65) Prior Publication Data
US 2020/0252193 A1     Aug. 6, 2020

(51) Int. Cl.
| | | |
|---|---|---|
| H04L 5/14 | (2006.01) | |
| H04L 7/00 | (2006.01) | |
| H04L 43/16 | (2022.01) | |
| H04L 1/00 | (2006.01) | |

(52) U.S. Cl.
CPC ............ H04L 5/14 (2013.01); H04L 1/0003 (2013.01); H04L 1/0009 (2013.01); H04L 7/007 (2013.01); H04L 43/16 (2013.01)

(58) Field of Classification Search
CPC ..... H04W 72/04; H04W 88/08; H04W 76/00; H04L 43/16; H04L 7/007; H04L 5/14; H04L 1/0009; H04L 1/0003
See application file for complete search history.

(56) References Cited

U.S. PATENT DOCUMENTS

| | | | |
|---|---|---|---|
| 6,336,201 B1* | 1/2002 | Geile | H04L 5/0037 714/755 |
| 7,469,013 B1* | 12/2008 | Bolt | H04L 1/0003 375/260 |
| 8,249,641 B1* | 8/2012 | Khanka | H04W 52/367 455/522 |
| 10,299,223 B2* | 5/2019 | Jha | H04B 7/0456 |
| 10,856,248 B2* | 12/2020 | Chun | H04W 12/08 |
| 2015/0146827 A1* | 5/2015 | Ohana | H04L 1/0047 375/341 |
| 2016/0028435 A1* | 1/2016 | Rakib | H04J 3/10 375/222 |
| 2017/0034688 A1* | 2/2017 | Kim | G01S 5/26 |
| 2017/0150330 A1* | 5/2017 | Kim | H04W 48/16 |
| 2017/0188391 A1* | 6/2017 | Rajagopal | H04W 74/0816 |
| 2017/0302315 A1* | 10/2017 | Sagong | H04L 5/006 |
| 2018/0110017 A1* | 4/2018 | Jha | H04L 1/0005 |

(Continued)

Primary Examiner — Hassan A Phillips
Assistant Examiner — Prenell P Jones
(74) Attorney, Agent, or Firm — Eversheds Sutherland (US) LLP

(57) ABSTRACT

In various embodiments, the disclosed systems, methods, and apparatuses describe the application of non-orthogonal multiple access (NOMA) over networks (e.g., cable networks). In particular, the disclosure describes: determining a signal for transmission to a receiving device; determining, by a processing component of the device, parameters associated with the transmission of the signal, the parameters comprising at least one of a power level, a modulation scheme, a frequency band, and a power spectral density; and transmitting, by a transmitting component of the device, the signal over a medium based on the parameters and using a NOMA technique.

20 Claims, 11 Drawing Sheets

(56) References Cited

U.S. PATENT DOCUMENTS

| | | | |
|---|---|---|---|
| 2018/0279239 A1* | 9/2018 | Si | H04W 76/28 |
| 2018/0288746 A1* | 10/2018 | Zhang | H04L 1/0031 |
| 2018/0294858 A1* | 10/2018 | Pehlke | H04B 7/0404 |
| 2018/0310257 A1* | 10/2018 | Papasakellariou | H04W 52/50 |
| 2019/0158137 A1* | 5/2019 | Brunel | H04B 1/04 |
| 2019/0215058 A1* | 7/2019 | Smyth | H04W 16/14 |
| 2019/0238101 A1* | 8/2019 | Song | H03F 3/19 |
| 2019/0268938 A1* | 8/2019 | Zhao | H04L 5/0048 |
| 2019/0277957 A1* | 9/2019 | Chandrasekhar | G01S 1/38 |
| 2019/0306923 A1* | 10/2019 | Xiong | H04W 72/042 |
| 2019/0349110 A1* | 11/2019 | Nammi | H04J 13/16 |
| 2019/0363843 A1* | 11/2019 | Gordaychik | H04W 72/042 |
| 2019/0380151 A1* | 12/2019 | Kim | H04W 74/0833 |
| 2020/0015206 A1* | 1/2020 | Lee | H04L 5/1469 |
| 2020/0084741 A1* | 3/2020 | Chun | H04W 60/00 |
| 2020/0092056 A1* | 3/2020 | Lei | H04L 5/0091 |
| 2020/0106574 A1* | 4/2020 | Lee | H04L 1/0016 |
| 2020/0153875 A1* | 5/2020 | Karampatsis | H04L 65/1073 |
| 2020/0187248 A1* | 6/2020 | Lee | H04W 72/12 |
| 2020/0213008 A1* | 7/2020 | Mutalik | H04L 12/2856 |
| 2020/0221507 A1* | 7/2020 | Kim | H04L 27/2602 |
| 2020/0229104 A1* | 7/2020 | MolavianJazi | H04W 52/367 |
| 2020/0245235 A1* | 7/2020 | Chun | H04W 48/18 |
| 2020/0288446 A1* | 9/2020 | Lee | H04W 72/0446 |
| 2020/0295891 A1* | 9/2020 | Koh | H04B 7/06 |
| 2021/0007094 A1* | 1/2021 | Lee | H04W 72/042 |
| 2021/0168726 A1* | 6/2021 | MolavianJazi | H04W 52/367 |

* cited by examiner

SYSTEMS AND METHODS FOR NON-ORTHOGONAL MULTIPLE ACCESS OVER NETWORKS

BACKGROUND

A variety of service providers, such as cable providers and satellite providers, may connect user devices to one or more networks, such as cable networks and/or the Internet. A provider may provide cable and/or Internet access to a residence via devices such as headends which may include a computer system and/or database required for provisioning of content. The headend may include cable modem termination system (CMTS), which can send and receive cable modem signals on a cable network to provide Internet services to cable subscribers. However, the residence may experience issues such as congestion, speed losses, pricing spikes, service interruptions, and the like that can degrade the user experience. Accordingly, there is a strong need in the market for systems and methods that remedy such problems and challenges.

BRIEF DESCRIPTION OF THE DRAWINGS

Figure 1:
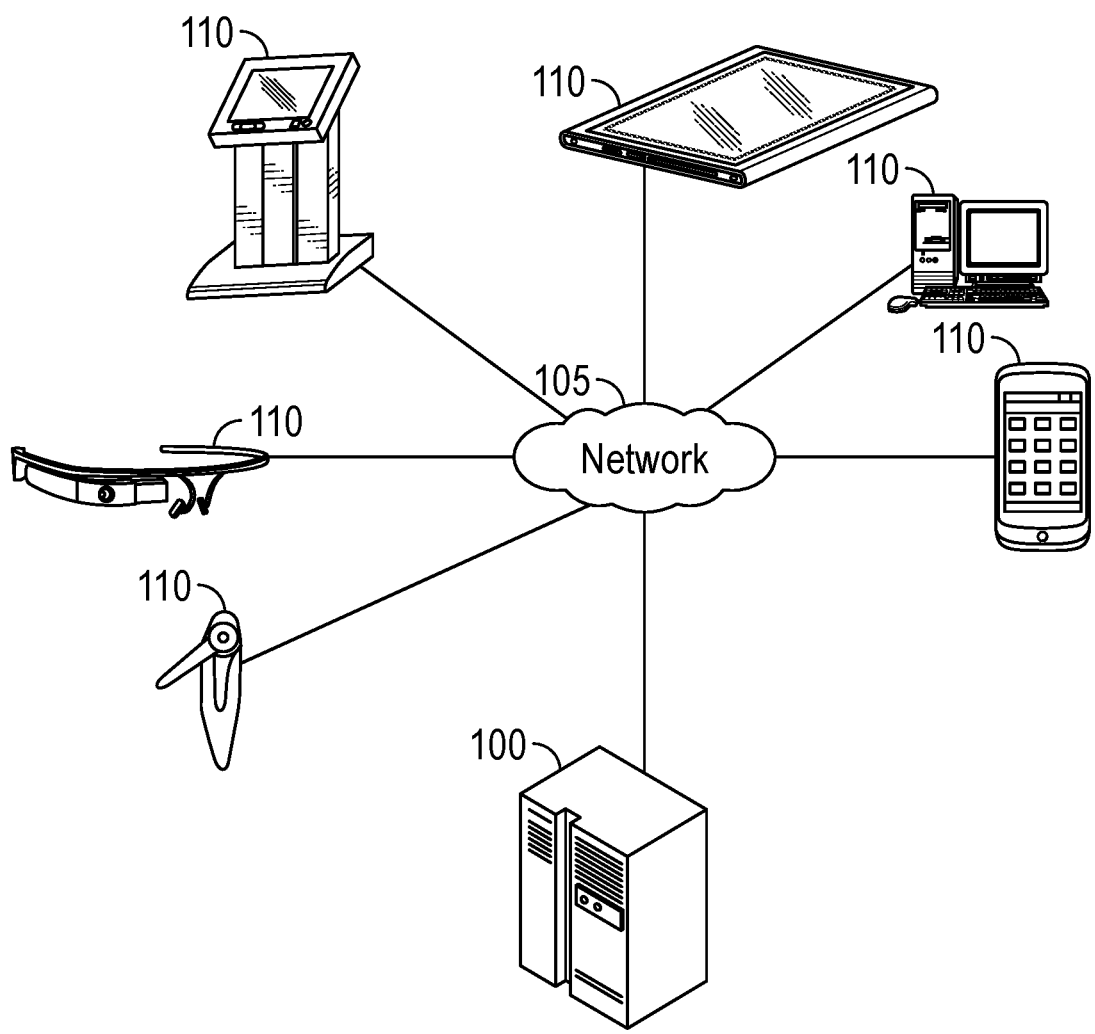
Figure 2:
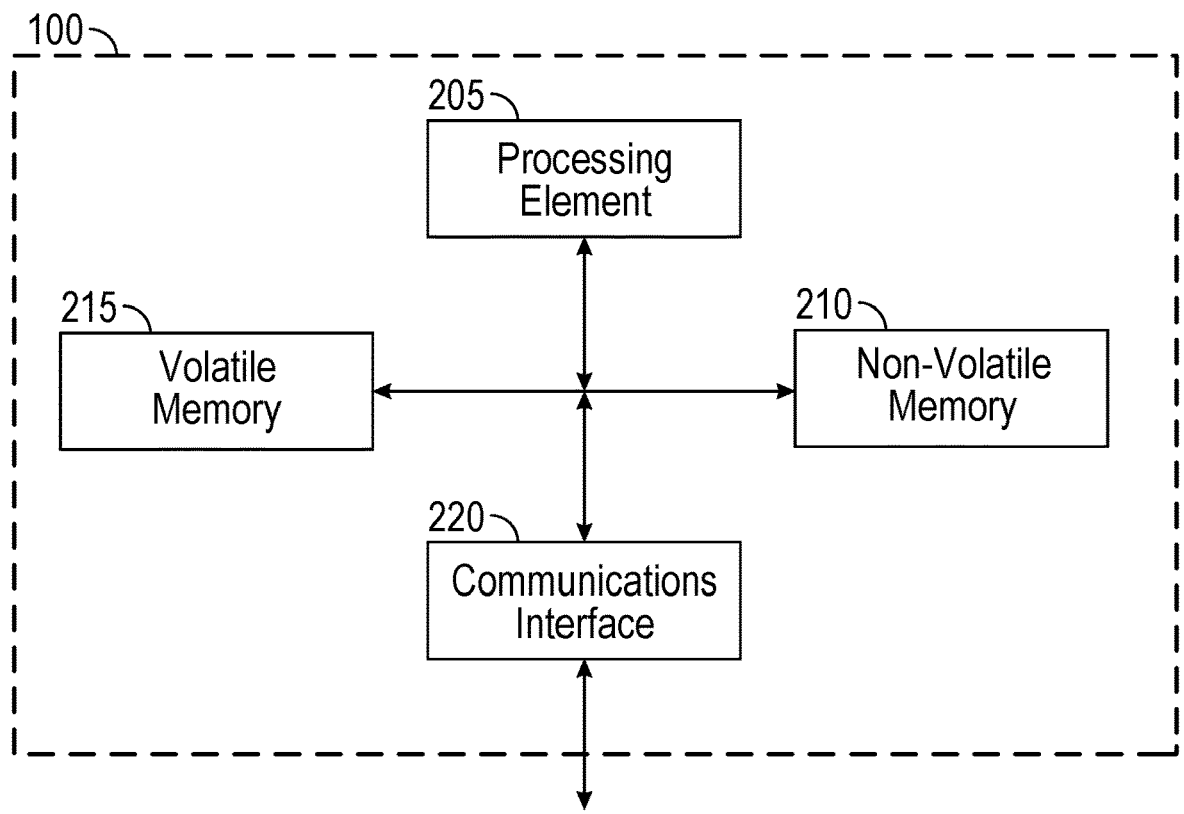
Figure 3:
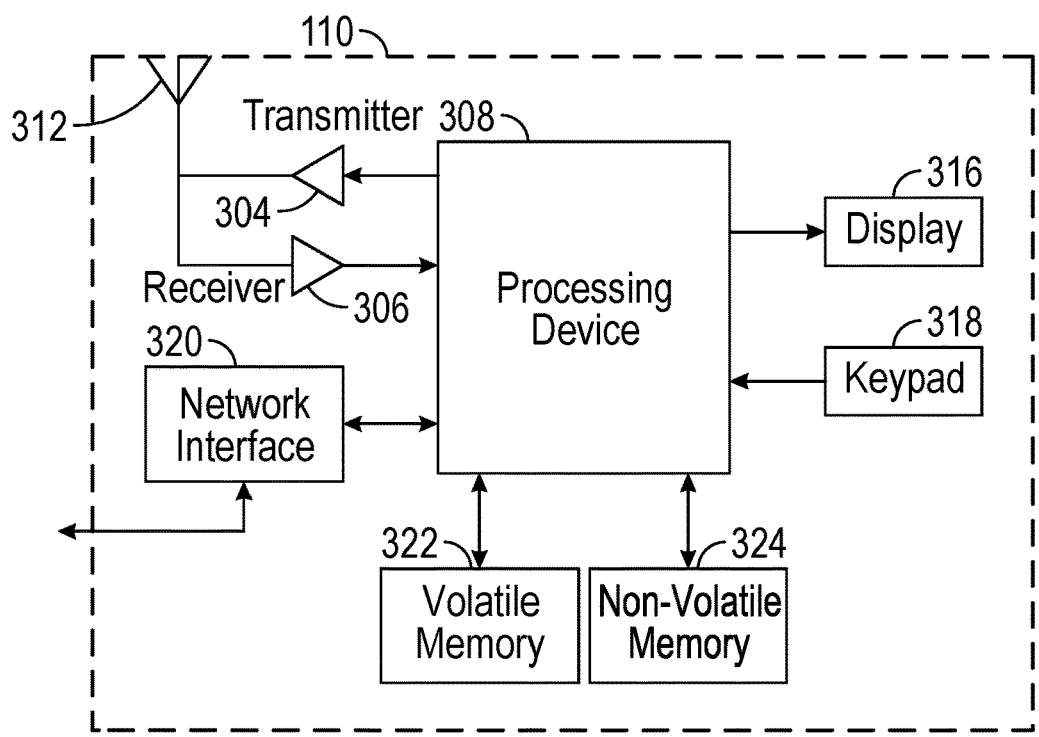
Figure 4:
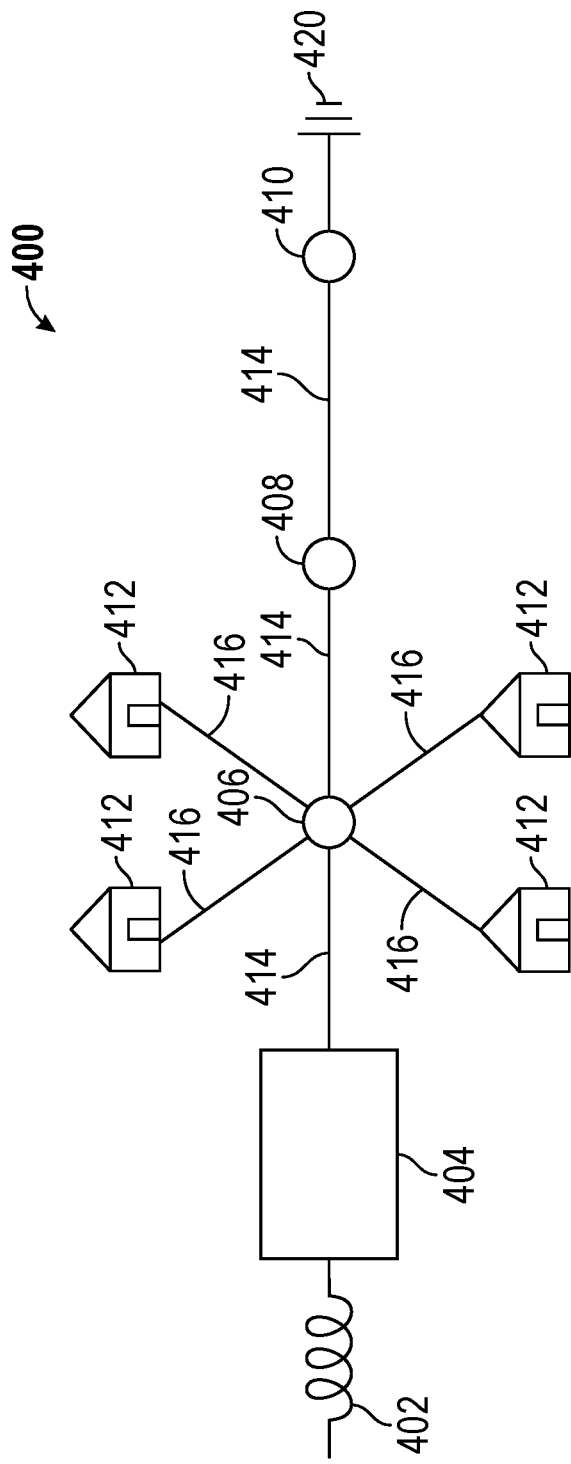
Figure 5:
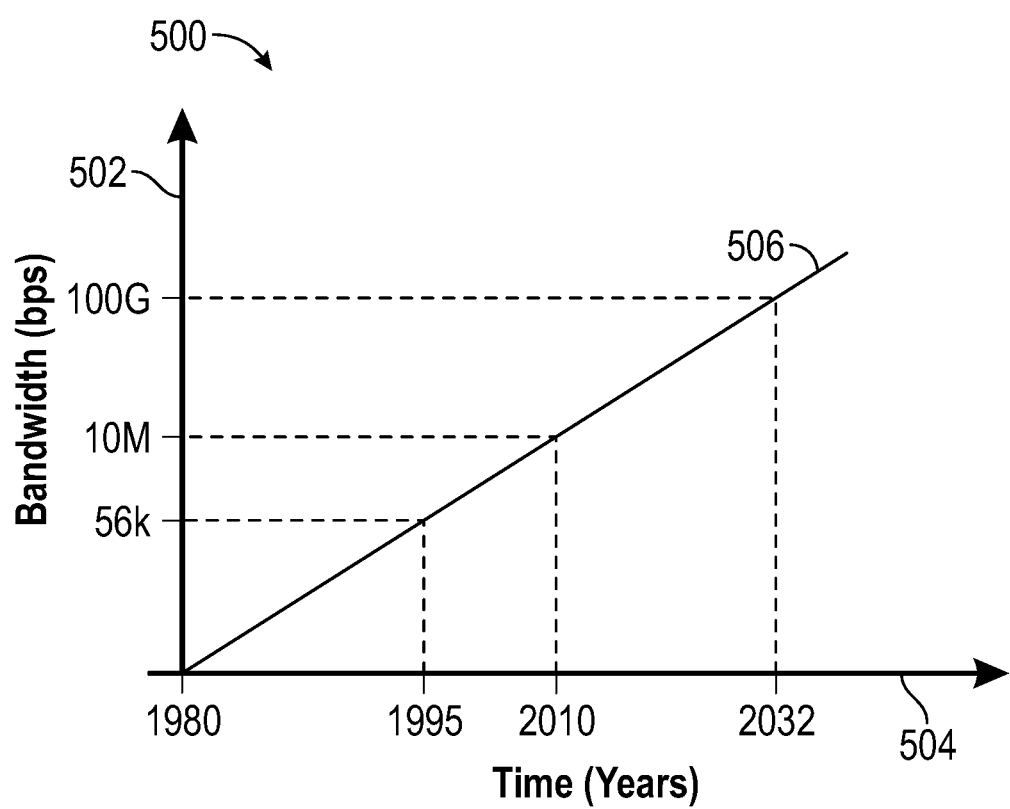
Figure 6:
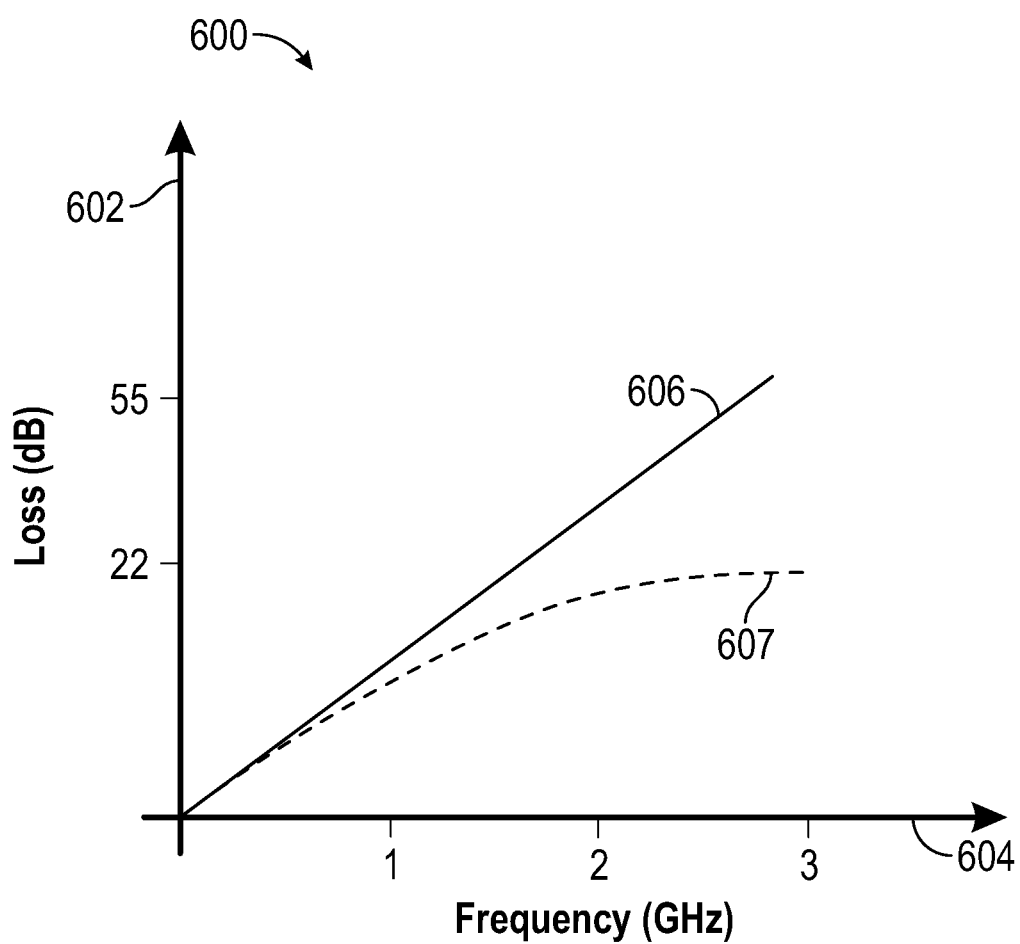
Figure 7:
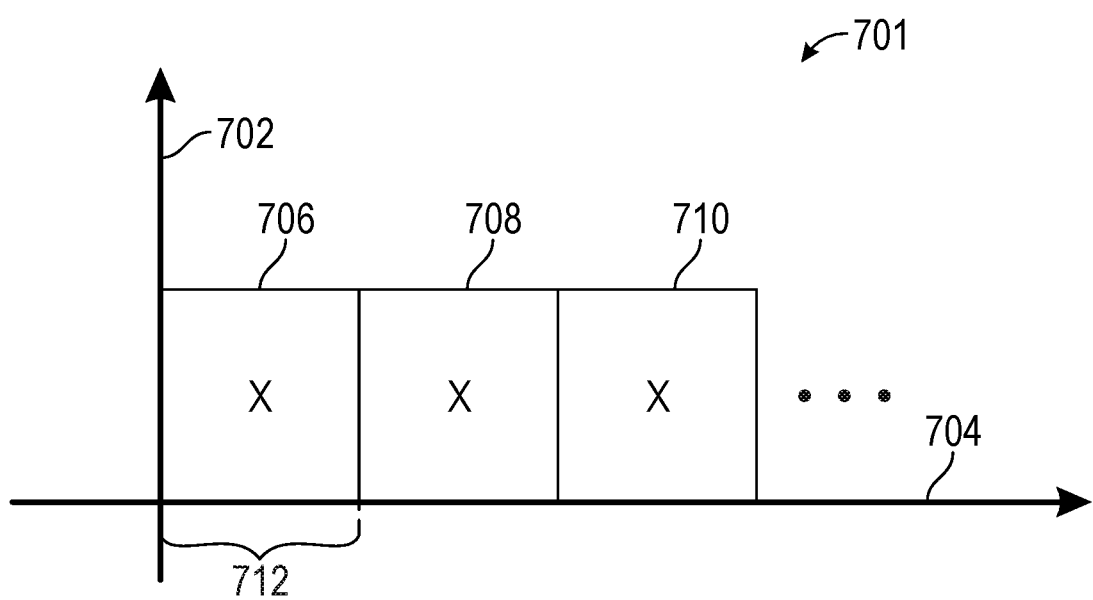
Figure 8:
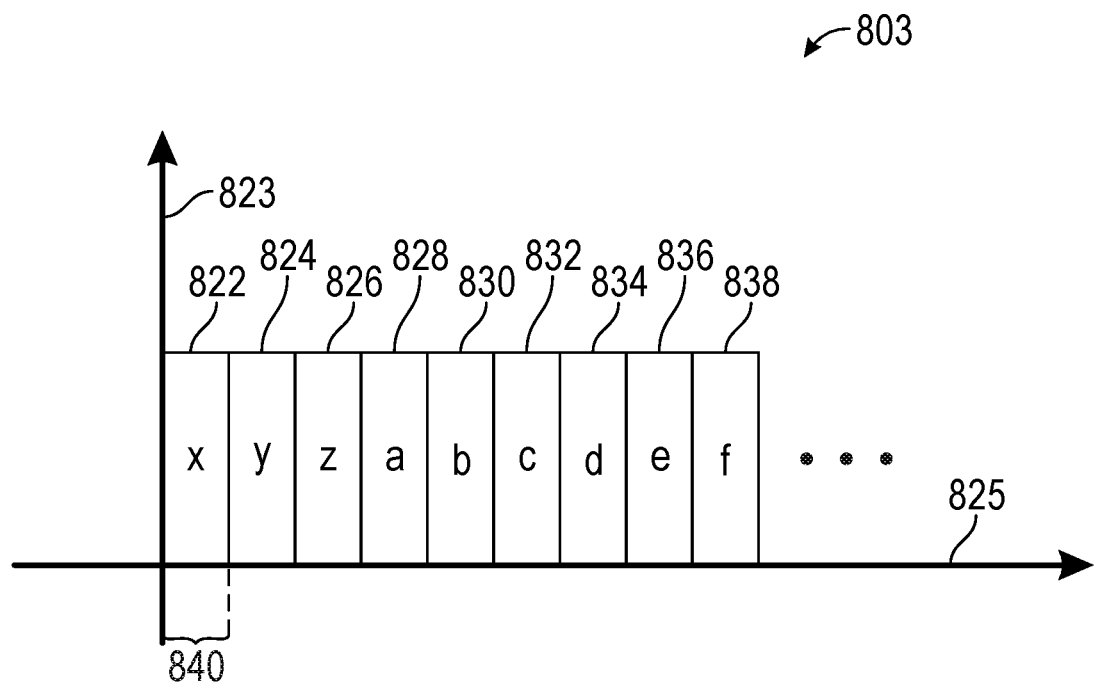
Figure 9:
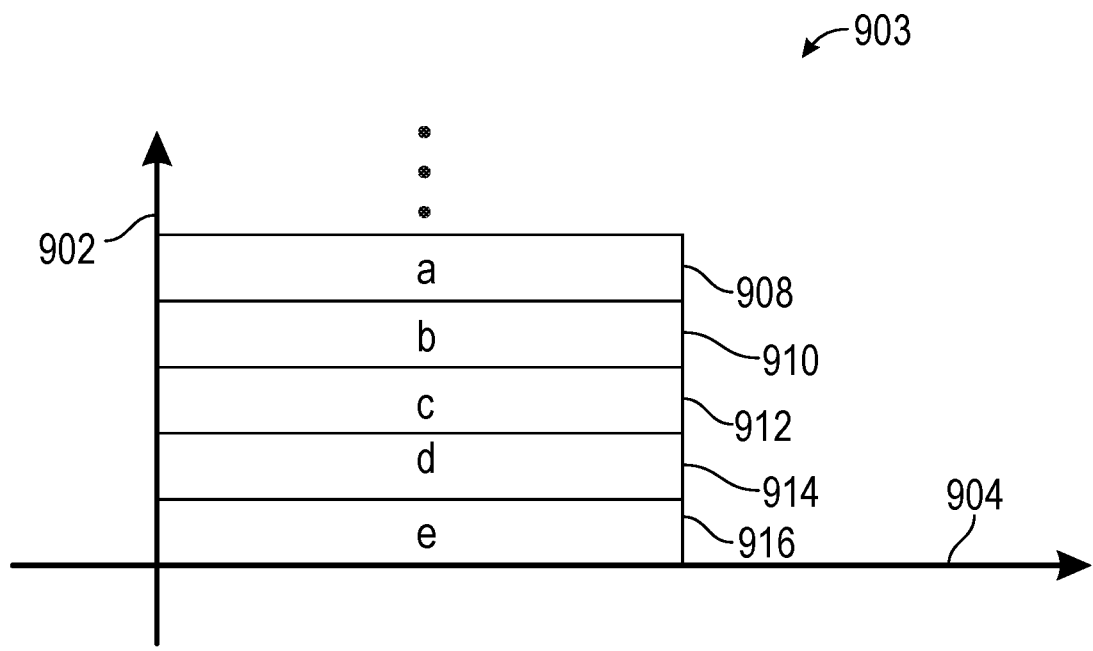
Figure 10:
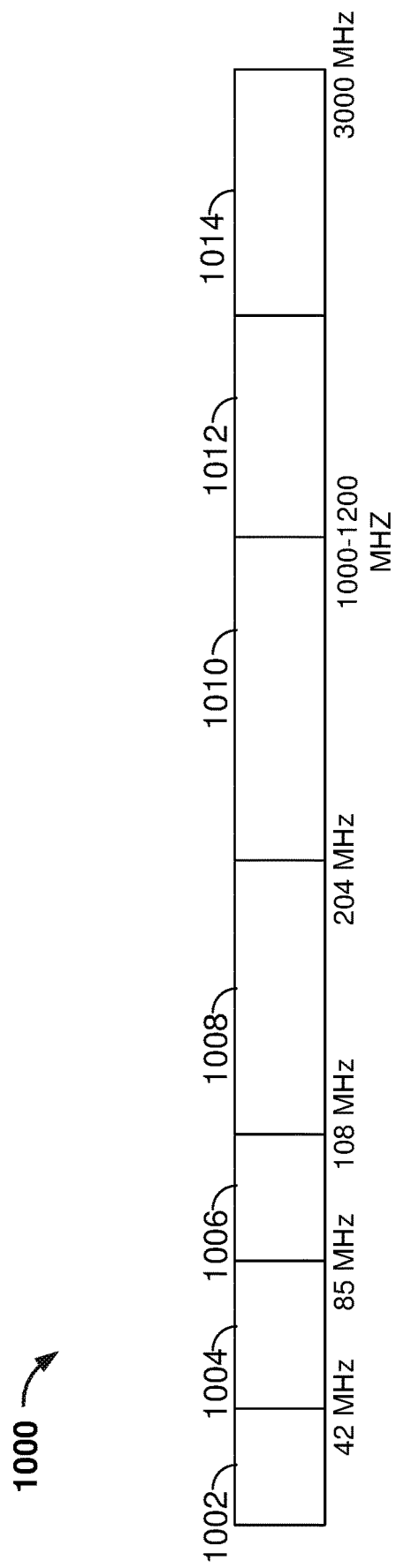
Figure 11:
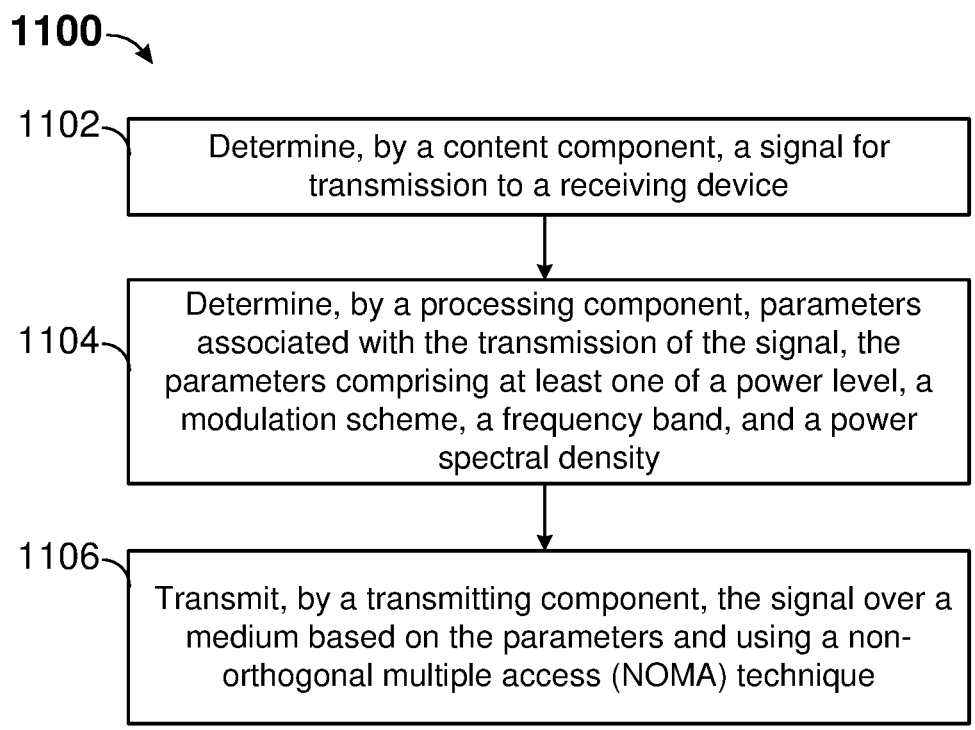
Figure 12:
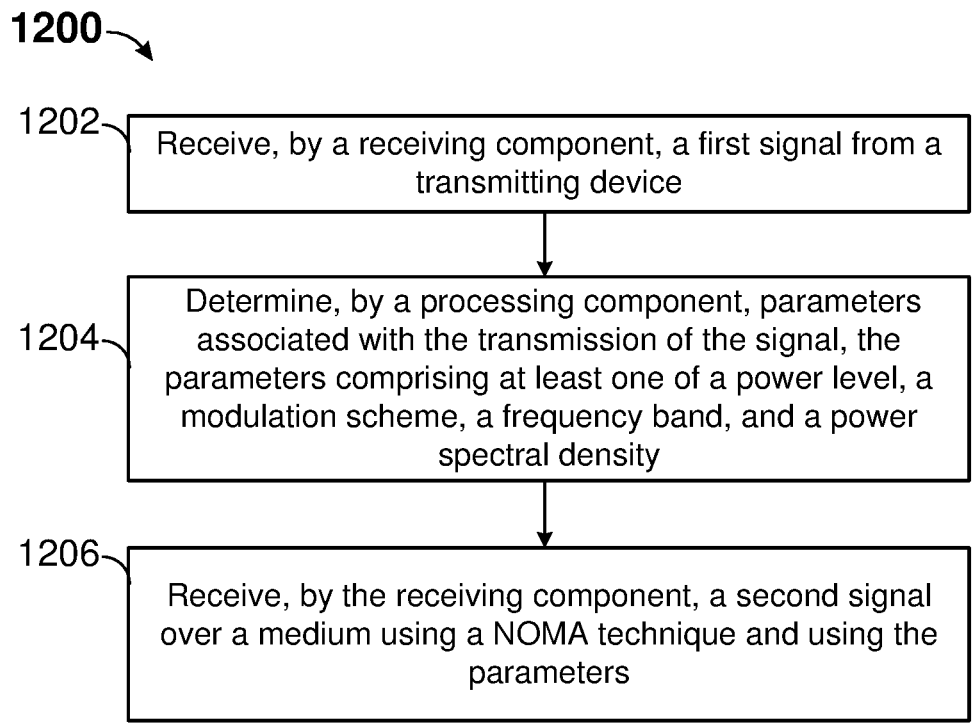

Having thus described the disclosure in general terms, reference will now be made to the accompanying drawings, which may not necessarily be drawn to scale, and wherein:

FIG. 1 is an overview of a system that can be used to practice example embodiments of the present disclosure;

FIG. 2 is an example schematic diagram of a management computing entity, in accordance with example embodiments of the disclosure;

FIG. 3 is an example schematic diagram of a user device, in accordance with example embodiments of the disclosure;

FIG. 4 shows an example schematic diagram of a portion of a cable network and associated devices, in accordance with example embodiments of the disclosure;

FIG. 5 shows an example diagram representing the increase of bandwidth requirements over time in cable networks, in accordance with example embodiments of the disclosure;

FIG. 6 shows an example diagram representing a plot of the loss in a cable network versus operational frequency, in accordance with example embodiments of the disclosure;

FIG. 7 shows an example schematic diagram of a plot of power spectral density (PSD) of subcarriers used in transmissions by devices over a network, in accordance with example embodiments of the disclosure;

FIG. 8 shows another example schematic diagram of a plot of the PSD of subcarriers used in transmissions by devices over the network, in accordance with example embodiments of the disclosure;

FIG. 9 shows an example schematic diagram of a plot of power versus time or frequency for transmissions over a network by devices using non-orthogonal multiple access (NOMA), in accordance with example embodiments of the disclosure;

FIG. 10 shows a diagram representing a spectrum usage for devices on a cable network, in accordance with example embodiments of the disclosure;

FIG. 11 shows a flow chart illustrating example operations that may be performed by one or more devices described in connection with the disclosed system, in accordance with various embodiments of the disclosure; and FIG. 12 shows another flow chart illustrating example operations that may be performed by one or more devices described in connection with the disclosed system, in accordance with various embodiments of the disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF VARIOUS EMBODIMENTS

In various embodiments, described herein include systems, methods, and apparatuses for non-orthogonal multiple access (NOMA) transmission over a network (e.g., a wired network such as a cable network). In one embodiment, a content component of a device may be configured to determine a signal for transmission to a receiving device. In another embodiment, a processing component of the device may be configured to determine parameters associated with the transmission of the signal. Moreover, the parameters comprising at least one of a power level, a modulation scheme, a frequency band, and a power spectral density. In another embodiment, a transmitting component of the device may be configured to transmit the signal over a medium based on the parameters and using a NOMA technique. In an aspect, the medium may include a coaxial cable. In another embodiment, the power level may be based on a sensitivity of the receiving device. Further, the power level may include a first power level associated with an upstream communication and a second power level associated with a downstream communication. In yet another embodiment, the power spectral density may be based at least in part on a sensitivity of the receiving device.

Other embodiments of this aspect include corresponding systems, apparatus, and computer programs, configured to perform the actions of the methods, encoded on computer storage devices.

Particular embodiments of the subject matter described herein can be implemented so as to realize one or more of the following advantages. Improve network stability and operational data transfer rates and, in turn, improve the user experience. Reduce the costs associated with routing network traffic, network maintenance, network upgrades, and/or the like.

The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid state drive (SSD)), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

FIG. 1 provides an illustration of an example embodiment of the present disclosure. As shown in FIG. 1, this particular embodiment may include one or more management computing entities 100, one or more networks 105, and one or more user devices 110. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

In various aspects, the management computing entities 100 may include various devices or portions of devices on a cable network, including, but not limited to, cable modems, optical nodes, switches, medium access control (MAC) devices, physical layer (PHY) devices, amplifiers, fiber nodes, access points (APs), and the like, variously described below. In another embodiment, such devices may include circuitry (e.g., processors and memory) and associated software instructions (e.g., computer code) to perform various functions associated with such devices (e.g., determine signals for transmission, modulate signals in accordance with one or more techniques such as NOMA, transmit signals including packets, receive including packets, process including packets, schedule including packets, etc.). Moreover, such management computing entities 100 may perform aspects of the transmission of data over networks in accordance with various protocols as described herein (e.g., at least with respect to FIGS. 4-12, below).

In another embodiment, the networks 105 may include, but not be limited to, cable networks including hybrid fiber-coaxial networks. More broadly, the networks 105 may include at least portions of wireless networks or wired networks. In another embodiment, a cable network may use various sub-networks (e.g., WiFi networks, cellular networks) to perform aspects of the functionality described herein, for example, in connection with the disclosed devices (e.g., switches, MAC devices, cable modem termination system (CMTS) devices, PHY devices, amplifiers, optical fiber nodes, access points, and the like). In another embodiment, the networks 105 may use at least a portion of a fifth-generation cellular mobile communications, also referred to as 5G herein.

In another embodiment, the user devices 110 may include, but not be limited to, devices associated with a customer premise equipment (e.g., devices located in the home of a user or on the person of a user). Non-limiting examples may include, but not be limited to, one or more computers, computing entities, desktop computers, mobile phones, tablets, phablets, notebooks, laptops, distributed systems, gaming consoles (for example Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein.

FIG. 2 provides a schematic of a management computing entity 100 according to one embodiment of the present disclosure. As noted above, a management computing entity 100 may include various devices on a cable network, including, but not limited to, switches, MAC devices, access point devices, PHY devices, amplifiers, fiber nodes, and the like.

Further, the management computing entity 100 may include a content component, a processing component, and a transmitting component (not shown). In particular, the content component may serve to determine signals indicative of data (e.g., video, audio, text, data, combinations thereof, and/or the like) to be transmitted over the network. In another embodiment, the determination of the signal for transmission may be, for example, based on a user input to the device, a predetermined schedule of data transmissions on the network, changes in network conditions, and the like. In one embodiment, the signal may include that data may be encapsulated in a data frame that is configured to be sent from a device to one or more devices on the network.

In another embodiment, the processing component may serve to determine various parameters associated with the signal for transmission over the network. For example, the processing component may serve to determine various parameters for the signal a modulation scheme (e.g., a particular quadrature amplitude modulation (QAM) modulation, to be discussed further below), a power level (a particular NOMA power level and/or code scheme), a frequency band (e.g., an approximately 1 GHz to approximately 3 GHz frequency band or any portion thereof), header information associated with the signal, combinations thereof, and/or the like.

In one embodiment, the transmitting component (not shown) may serve to transmit the signal from one device to another device on the network. For example, the transmitting component may serve to prepare a transmitter (e.g., transmitter 304 of FIG. 3, below) to transmit the signal over the network. For example, the transmitting component may queue the signal in one or more buffers, may ascertain that the transmitting device and associated transmitters are functional and have adequate power to transmit the signal over the network, may adjust one or more parameters (e.g., modulation type, signal amplification, signal power level, noise rejection, combinations thereof, and/or the like) associated with the transmission of the signal.

In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (for example Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. For instance, the management computing entity 100 may communicate with user devices 110 and/or a variety of other computing entities.

As shown in FIG. 2, in one embodiment, the management computing entity 100 may include or be in communication with one or more processing elements 205 (also referred to as processors, processing circuitry, and/or similar terms used herein interchangeably) that communicate with other elements within the management computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the management computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity 100 with the assistance of the processing element 205 and operating system.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Zigbee, Bluetooth protocols, wireless universal serial bus (USB) protocols, and/or any other wireless protocol.

Although not shown, the management computing entity 100 may include or be in communication with one or more input elements, such as a keyboard input, a mouse input, a touch screen/display input, motion input, movement input, audio input, pointing device input, joystick input, keypad input, and/or the like. The management computing entity 100 may also include or be in communication with one or more output elements (not shown), such as audio output, video output, screen/display output, motion output, movement output, and/or the like.

As will be appreciated, one or more of the management computing entity's 100 components may be located remotely from other management computing entity 100 components, such as in a distributed system. Furthermore, one or more of the components may be combined and additional components performing functions described herein may be included in the management computing entity 100. Thus, the management computing entity 100 can be adapted to accommodate a variety of needs and circumstances. As will be recognized, these architectures and descriptions are provided for example purposes only and are not limiting to the various embodiments.

A user may be an individual, a family, a company, an organization, an entity, a department within an organization, a representative of an organization and/or person, and/or the like. In one example, users may be employees, residents, customers, and/or the like. For instance, a user may operate a user device 110 that includes one or more components that are functionally similar to those of the management computing entity 100. In some embodiments, user devices 110 may include, but not be limited to, devices associated with a customer premise equipment, as described above. In another embodiment, the user device 110 may be configured to receive data from an access point, or other similar device (e.g., at a customer premise equipment site such as a home).

In various aspects, the processing component, the transmitting component, and/or the receiving component (not shown) may be configured to operate on one or more devices (e.g., device 404 to be shown and described in connection with FIG. 4, below, which may include a CMTS, another network controller device further upstream on the network, and/or other devices further downstream on the network) may include aspects of the functionality of the management computing entity 100, as shown and described in connection with FIGS. 1-2 here. In particular, the processing component, the transmitting component, and/or the receiving component may be configured to be in communication with one or more processing elements 205, memory 210, volatile memory 215, and may include a communication interface 220 (e.g., to facilitate communication between devices, for example, with various customer premise equipment such as cable modems).

FIG. 3 provides an illustrative schematic representative of a user device 110 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (for example Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User devices 110 can be operated by various parties. As shown in FIG. 3, the user device 110 can include an antenna 312, a transmitter 304 (for example radio), a receiver 306 (for example radio), and a processing element 308 (for example CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the user device 110 may be capable of operating with one or more air interface standards, communication protocols, modulation types, and access types. More particularly, the user device 110 may operate in accordance with any of a number of wireless communication standards and protocols, such as those described above with regard to the management computing entity 100. In a particular embodiment, the user device 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user device 110 may operate in accordance with multiple wired communication standards and protocols, such as those described above with regard to the management computing entity 100 via a network interface 320.

Via these communication standards and protocols, the user device 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user device 110 can also download changes, add-ons, and updates, for instance, to its firmware, software (for example including executable instructions, applications, program modules), and operating system.

According to one embodiment, the user device 110 may include location determining aspects, devices, modules, functionalities, and/or similar words used herein interchangeably. For example, the user device 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user device's 110 position in connection with a variety of other systems, including cellular towers, Wi-Fi access points, and/or the like. Similarly, the user device 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (for example smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user device 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the user device 110 to interact with and/or cause display of information from the management computing entity 100, as described herein. The user input interface can comprise any of a number of devices or interfaces allowing the user device 110 to receive data, such as a keypad 318 (hard or soft), a touch display, voice/speech or motion interfaces, or other input devices. In embodiments including a keypad 318, the keypad 318 can include (or cause display of) the conventional numeric (0-9) and related keys (#, *), and other keys used for operating the user device 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user device 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user device 110. As indicated, this may include a user application that is resident on the entity or accessible through a browser or other user interface for communicating with the management computing entity 100 and/or various other computing entities.

In another embodiment, the user device 110 may include one or more components or functionality that are the same or similar to those of the management computing entity 100, as described in greater detail above. As will be recognized, these architectures and descriptions are provided for example purposes only and are not limiting to the various embodiments.

In various embodiments, embodiments of the disclosure are generally directed to systems, methods, and apparatuses for using a non-orthogonal multiple access (NOMA) technique for transmitting and receiving signals including data and information over at least portions of a wired network, including, but not limited to, a cable network. In one embodiment, the disclosure describes using a NOMA technique to communicate over at least portions of a wireless network (e.g., a 5G network). In various embodiments, the disclosure enables may enable higher spectral efficiency and throughput on wired networks, wireless networks, or both. In particular, as compared with orthogonal multiple access (OMA) techniques such as orthogonal frequency division multiplexing (OFDM) and orthogonal frequency division multiple access (OFDMA), NOMA may provide for one or more of the following advantages: increased spectral efficiency due to use of multiple users on the same frequency bands, increased connectivity by serving more uses simultaneously at the same time, lower latency due to simultaneous transmission in a given time interval rather than at dedicated scheduled time slots, and better quality of service (QoS) to users using flexible power control algorithms.

As used herein, orthogonality in the context of multiple-access schemes for communications systems, may refer to communications where an ideal receiver can reject strong unwanted signals from the desired signal using different basis functions to encode the signals. In particular, OMA schemes may use time-division multiple access (TDMA) and frequency-division multiple access (FDMA) channel access techniques. In TDMA, the data associated with a given user's device may be sent in non-overlapping time slots; accordingly, TDMA-based networks may need accurate timing synchronization, which may be challenging in data uplink. In FDMA implementations such as OFDMA, data associated with a given user's device may be assigned to a subset of subcarriers. Further, another OMA technique may include a code-division multiple access (CDMA) technique, which may involve coding the data associated with a given user's device in order to separate different users over the same channel.

In various embodiments, NOMA may be different than these multiple access schemes which provide orthogonal access to the users either in time, frequency, code or space. In one embodiment, in NOMA, devices communicating over the network may operate in the same frequency band and/or at the same time, but the devices and their corresponding communications may be distinguished from one another by the power levels associated with those communications. In one embodiment, a NOMA technique may implement superposition coding at a transmitting device (e.g., a headend) and a receiving device (e.g., a cable modem) may implement a successive interference cancellation (SIC) technique to separate the devices and corresponding data and may do so both in the uplink and in the downlink channels.

In an embodiment, as noted, NOMA may use the power domain to separate signals having differences in their individual power level from each other for transmission over the network. At a receiving device (e.g., a cable modem), higher power level signals may be separated out and isolated from the lower power level signal. In some embodiments, NOMA may introduce non-orthogonality in a transmitted signal either in time, frequency or code, and a total signal may be generated as a superposition of multiple signals (e.g., via a superposition coding technique) at different power levels and transmitted over the medium (e.g., coaxial cable). In one embodiment, in NOMA for downlink transmission (e.g., from the headend to a cable modem), more power is allocated to devices including user equipment (UE) located farther from the transmitting device (e.g., headend) and the least power to devices including UE that are closest to the transmitting device.

In another embodiment, the multiple signals being transmitted from a transmitting device to a receiving device may be associated with different content types (e.g., video, audio, data and the like), or may be associated with signals directed to different receiving devices (e.g., a first signal directed for a first receiving device, a second signal directed to a second receiving device, and the like). Further, as the total signal is received at a receiving device, the receiving device may perform demultiplexing based on the power difference between the multiple signals. In particular, to extract a given signal from the total signal, a technique such as SIC may be used by the receiving device. In particular, using the SIC technique, the receiving device may first decode the signal in the received transmission that is the strongest one while treating other signals in the transmission as interference and/or noise. In another embodiment, the first decoded signal may then be subtracted from the received signal and, if the decoding is determined to be greater than in quality than a predetermined threshold, the residual signal (e.g., the signal including the rest of the signals) is accurately obtained. In one embodiment, the SIC technique may be iteratively applied by a receiving device until the receiving device determines the signal that was intended for it (as opposed to determining other signals in the transmission intended for other devices on the network).

In one embodiment, the SIC or other suitable algorithms for signal extraction from a NOMA signal may be based at least in part on channel properties associated with the channel over which the transmitting device and the receiving device communicate, the received signal to noise ratio (SNR) difference associated with communications between the transmitting device and the receiving device, combinations thereof, and/or the like. In another embodiment, power sharing of the individual signals in the total signal may reduce the power allocated to each receiving device; in particular, receiving devices having comparatively high channel gains and receiving devices with comparatively low channel gains may be scheduled more frequently and may be assigned more bandwidth. In particular, the receiving device may first decode a signal it decodes that the receiving device receives from the nearest transmitting user device or the user device communicating on the strongest channel. Moreover, the last signal that the receiving device decodes may be the signal for the farthest user device or the signal from the user device on the weakest channel. Accordingly, by using NOMA the network capacity, throughput, and fairness of the network transmissions may be improved for all devices of the network.

In various embodiments, uplink implementation of NOMA may implement a different procedure as compared with downlink implementation of NOMA. In the uplink, the user devices may optimize transmit powers according to the user device's device and data characteristics (e.g., power level capability, type of data to be transmitted, etc.) and corresponding channel conditions (e.g., noisy, clear, etc.). In some embodiments, the channel conditions of the receiving device may include a sensitivity of the receiving device. In another embodiment, the sensitivity of a device may refer to the minimum magnitude of input signal required to produce a specified output signal having a specified signal-to-noise ratio, or other specified criteria. Further, the receiving device (in this case, for example, a headend) may implements SIC or a similar technique. As noted, the receiving device may first decode a signal it decodes that the receiving device receives from the nearest transmitting user device or the user device communicating on the strongest channel. Moreover, the last signal that the receiving device decodes may be the signal for the farthest user device or the signal from the user device on the weakest channel.

In various embodiments, described above included various implementations of power-domain NOMA which attains multiplexing in power domain. Unlike power-domain NOMA, code-domain NOMA may achieve multiplexing in a code domain. Like the basic code division multiple access (CDMA) systems, code-domain NOMA may share the entire available resources (time/frequency) among various transmitting devices and receiving device on a network (e.g., a wired cable network). In contrast to CDMA, code-domain NOMA may use user-device specific spreading sequences that may be either sparse sequences or may include non-orthogonal cross-correlation sequences having low correlation coefficient. In various embodiments, a code domain NOMA may implement various aspects of CDMA in conjunction with the NOMA technique. for example, non-limiting examples of code-domain NOMA that may be used in connection with CDMA and with various embodiments described herein include, but may not be limited to, low-density spreading CDMA (LDS-CDMA) low-density spreading-based OFDM (LDS-OFDM), and sparse code multiple access (SCMA).

In some embodiments, various embodiments of the disclosure may use a NOMA technique in addition to a conforming to one or more rules specified by a network specification. For example, the various embodiments of the disclosure may conform with a data over cable service interface specification (DOCSIS) specification, including, but not limited to, a DOCSIS comprises at least one of (i) a DOCSIS 1.0, (ii) a DOCSIS 2.0, (iii) a DOCSIS 3.0, (iv) a DOCSIS 3.1, or (v) a DOCSIS 3.1 full-duplex specification. In particular, the DOCSIS specification may enable the deployment of data-over-cable systems on a nonproprietary, multivendor, interoperable basis for bidirectional transfer of Internet Protocol (IP) traffic between a cable system headend and customer equipment over an all-coaxial or hybrid-fiber/coax (HFC) cable network. In another embodiment, hybrid fiber-coaxial (HFC) can refer to a broadband network that combines optical fiber and coaxial cable. In some embodiments, the system can include a CMTS or access controller node located at the headend, a coaxial or HFC medium, and cable modems (CMs) located at the premises of the customer, in conjunction with DOCSIS-defined layers that support interoperability features. In some embodiments, the CMTS or access controller node can refer to a piece of equipment, for example, equipment located in a cable company's headend or hubsite, which can be used to provide data services, such as cable Internet or Voice over Internet Protocol (VoIP). In some embodiments, the CMTS or access controller node can include aspects of the functionality of the management computing entity 100, described above.

FIG. 4 shows an example schematic diagram of a portion of a cable network and associated devices, in accordance with example embodiments of the disclosure. FIG. 4 shows an example diagram 400 of a portion of a cable network and associated devices in a particular network deployment, in accordance with example embodiments of the disclosure. Further, the network deployment may represent an at least partially wired network (e.g., a cable network) on which aspects of the disclosure related to data transmissions by various devices on the network in accordance with NOMA techniques may be represented. In some embodiments, the cable network described herein can be implemented using a DOCSIS specification. In an embodiment, there can be a device 404. The device 404 can include a CMTS, which can also be referred to as an access controller, a controller, and/or a node herein. In another embodiment, the device 404 can serve as remote PHY device, that is, a device having PHY layer functionality (that is, PHY layer functionality as described in connection with the open systems interconnection model, OSI model). In various embodiments, the PHY layer functionality may refer to the electronic circuit transmission technologies of a network and serve as a fundamental layer underlying the higher-level functions in the network. Further, the PHY layer may serve to define the means of transmitting raw bits rather than logical data packets over a physical data link connecting network nodes (e.g., various devices of the network). The bitstream may be grouped into code words or symbols and converted to a physical signal (e.g., a radio frequency (RF) signal, optical signal, combinations thereof, and/or the like) that is transmitted over a transmission medium (e.g., coaxial cable, fiber, combinations thereof, and/or the like).

In an embodiment, there can be a fiber 414 connected to the device 404; the device 404 can further be connected to various network cable taps 406, 408, and 410, also referred to as taps or terminations herein, and can connect to various cable modem (CM) devices, for example, at various households 412.

In some embodiments, a cable network can include a fiber optic network, which can extend from the cable operators' headend out to a neighborhood's hubsite, and finally to a coaxial cable node which serves customers, for example, approximately 25 to approximately 2000 households.

In an embodiment, data can be transmitted downstream from the device 404 to one or more homes 412 over drop cables (also referred to as drops herein) 416 using one or more taps 406, 408, and 410. In another embodiment, the data may be transmitted on the downstream in accordance with a NOMA technique, as described herein. In particular, the NOMA technique may include a power-multiplexing NOMA technique or a code-domain (e.g., CDMA) based NOMA technique as described above.

In an embodiment, as the data is transmitted downstream from the device 404 to one or more homes 412, the taps 412 can potentially generate various impairments on the network. Alternatively or additionally, as the signals pass through from the device 404 to the taps 406, 408, and 410 over fibers 414 and to the homes 412 over one or more drops 416, the fibers 414 and/or the drops 416 can cause the signals to undergo various impairments, for example, to the power spectral density of the signals. In an embodiment, the impairment can be due to attenuation on the fibers 414 and/or drops 416. In an embodiment, the impairments can lead to frequency distortions on the signals; for example, the higher frequency end of the signals may be attenuated.

Accordingly, in an embodiment, one or more amplifiers (not shown) can be used to perform a gain on the attenuated signals. In an embodiment, the one or more amplifiers can be placed, for example, at one or more of the taps 406, 408, and 410 to perform the gain on the attenuated signals.

In an embodiment, the homes 412, the devices in the homes 412, and taps 406, 408, and/or 410 can introduce different distortions on the drop cables 416 and/or fibers 414. In an embodiment if the distortion is introduced on a given fiber 414 feeding a first tap 406 of the taps 406, 408, and/or 410, different homes of the homes 412 may receive a similar distortion to signals being transmitted and received from one or more devices at the homes 412. In another embodiment, a distortion in at given tap of the taps 406, 408, and/or 410, a distortion at a given drop of the drops 416, or distortions associated with one or more cables and/or wires of one or more devices in a given home of the homes 412, may cause signals being received and transmitted at the various taps 406, 408, and/or 410, and/or signal being transmitted or received by the devices in the different homes 412 to undergo different signal distortions.

Likewise, in an embodiment, if the devices at various homes 412 are transmitting data upstream, the distortion to the signals experienced by devices at different homes 412 can be different. In an embodiment, the data may be transmitted on the upstream in accordance with a NOMA technique, as described herein. In particular, the NOMA technique may include a power-multiplexing NOMA technique or a code-domain (e.g., CDMA) based NOMA technique as described above.

In an embodiment, a given transmitting device on the network can transmit a pre-determined sequence, for example a 32-symbol (or any suitable number of symbol) sequence where each symbol includes a pre-determined amount of data, to the receiving devices. Accordingly, when the receiving devices receive the pre-determined sequence, the receiving devices may be programmed to be able to determine one or more characteristics that the signal associated with the received pre-determined sequence should have. Therefore, the receiving device can determine whether there is a deviation from the what the receiving device would have received absent distortions in the received signal.

In an embodiment, the receiving devices can take various measurements, for example, measurements to characterize one or more channels associated with signals received by the receiving device, and/or one or more measurements associated with the received signal from the transmitting device, including, but not limited to, signal-to-noise ratio (SNR) measurements, minimum end-of-line (MER) measurements, slopes measurements, amplitude measurements, ripple measurements, spike (for example, non-linear noise distortions) measurements, absolute received power per subcarrier measurements, error vector magnitude measurements, and the like. The receiving device can then transmit at least portions of the measurements in informational blocks, for example, as data packets, back to the transmitting device. The transmitting device can modify a table based on the received information from the receiving device, for example, a table stored in internal memory. In an embodiment, the table can include information such as what sequence the receiving device would have received absent any distortions to the signal, what sequence the receiving device actually received, what sequence the transmitting device received back from the receiving device (which may also be subject to further distortions), and/or any information indicative of the measurements taken by the receiving device of the channel and/or the received signal, as described above. In some embodiments, the CMTS or controller can determine interference groups (IGs) based on the received information from the receiving devices.

In various embodiments, the network and various devices on the network (e.g., the CMTS, controllers, receiving devices, combinations thereof, and/or the like), may determine the appropriate power levels for transmitting various signals on the network in accordance with a NOMA technique (e.g., a power-multiplexing NOMA technique) based on the various measurements described above, and/or based at least in part on the received pre-determined sequences. In additional or alternative embodiments, the network and various devices on the network may determine the appropriate code words and schemes for transmitting various signals on the network in accordance with a NOMA technique (e.g., a CDMS-based NOMA technique) based on the various measurements described above, and/or based at least in part on the received pre-determined sequences. For example, the power levels for transmitting various signals over the network in accordance with power-multiplexing NOMA technique may determine to transmit a first signal at a higher power for a receiving device that is communicating on a weaker channel, which may be determined by numerous factors, individually or in combination, such as one or more measurements indicative of the efficacy of receiving the pre-determined sequences by the receiving device, SNR measurements, MER measurements, slopes measurements, amplitude measurements, ripple measurements, non-linear noise distortion measurements, absolute received power per subcarrier measurements, error vector magnitude measurements, and/or the like.

In some embodiments, the cable network as described above can include a regional or area headend/hub. The hub can receive programming that is encoded, modulated and upconverted onto radio frequency (RF) carriers, combined onto a single electrical signal and inserted into a broadband transmitter, for example, an optical transmitter. In some embodiments, the transmitter can convert the electrical signal to a downstream modulated signal that is sent to the nodes. Fiber optic cables connect the headend or hub to nodes in various topologies, including, but not limited to, point-to-point or star topologies, ring topologies, and the like.

By using frequency-division multiplexing and/or the NOMA-based techniques described herein, an HFC network such as the one described in connection with FIG. 4 may carry a variety of services, for example, analog and digital TV, video on demand, telephony, data, and the like. Services on these systems can be carried on radio frequency (RF) signals in particular regions of the available spectrum.

In one embodiment, the HFC network can be operated bi-directionally such that signals are carried in both directions on the same network. For example, the signals can be transmitted from the headend/hub office to the customer, and from the customer to the headend/hub office. In one aspect, a forward-path or downstream signals can refer to information from the headend/hub office to the customer. In another embodiment, a return-path or upstream signals can refer to information from the customer to the headend/hub office. The forward-path and the return-path can be carried over the same coaxial cable in both directions between the node and the customer equipment. In some embodiments, HFC network can be structured to be asymmetrical, that is, data transmission in the downstream direction has much more data-carrying capacity than the upstream direction.

In various aspects, the device 404 (e.g., CMTS device) and/or the network cable taps 406, 408, and 410 may include aspects of the functionality of the management computing entity 100, as shown and described in connection with FIGS. 1-2, above. In particular, the device 404 (e.g., CMTS device) and/or the network cable taps 406, 408, and 410 may include or be in communication with one or more processing elements 205, memory 210, volatile memory 215, and may include a communication interface 220 (e.g., to communicate with between each other and with various customer premise equipment such as cable modems).

Moreover, the homes 412 may include customer premise equipment may include devices that include aspects of the functionality of the user device 110, as further shown and described in connection with FIG. 3, above. For example, customer premise equipment at the homes 412 may include devices having a transmitter 304, a receiver 306, and/or a network interface (e.g., to communicate with an access point or other device to receive information from the fiber node 414 or similar device). Moreover, the devices at the customer premise equipment may include volatile memory 322 and/or non-volatile memory 324 in addition to a processor (e.g., to perform one or more computational tasks, such as processing received signals, etc.). Further, the customer premise equipment may include a display 316 and/or a keypad 318 (e.g., for interacting with a user or operator). As noted, the customer premise equipment including user devices (e.g., such as user device 110) may be configured to transmit and receive signals in accordance with a NOMA technique, as described variously herein.

FIG. 5 shows an example diagram representing the increase of bandwidth requirements over time in cable networks (e.g., the Nielsen curve), in accordance with example embodiments of the disclosure. In particular, diagram 500 represents a plot of the logarithm of data rate (e.g., corresponding to broadband Internet speeds) usage in units of bits per second on the y-axis 502 versus time in units of years on the x-axis 504. As noted, the y-axis 502 of diagram 500 has a logarithmic scale, and therefore, a straight line in the diagram 500 may represent an exponential growth by a constant percentage for every year shown. Further, the data points in diagram 500 show the various speeds with which a device may be capable of connecting to a network such as a cable network. In particular, the data points that correspond with earlier times may represent an approximately 300 bps used in acoustic modem in the 1980s, while later data points may correspond to more advanced technologies such as integrated services digital network (ISDN) lines, which may be used at approximately 10 Gbps in 2018, and ultimately projected to rise to the order of 100 Gbps by 2032. In another embodiment, the curve 506 may represent an exponential growth curve (shown as linear in a log-plot) indicative of an approximately 50% annualized growth, in conformance with Nielsen's law.

In various embodiments, the average bandwidth requirements as represented by diagram 500 may increase relatively slowly (e.g., in comparison with other growth rates for other technologies) for several reasons, including, but not limited to, the fact that telecommunication companies may be fiscally conservative, since streets and other infrastructural changes and corresponding installation of equipment in hundreds of thousands of central offices may require large capital investments. Further, users may be reluctant to spend on devices having larger bandwidth capabilities, since increases in the capacity of modems may not necessarily translate into immediate download and upload speeds of increases at least because the bandwidth increase may be a function of infrastructural upgrades, which may be gradual. Accordingly, various embodiments of the disclosure (e.g., various embodiments directed to using a NOMA technique for signal transmission over the network) serve to provide systems, methods, and apparatuses for communicating on higher speed networks and meeting user bandwidth demands, and thereby accelerate the pace of bandwidth increase on networks (e.g., cable networks).

FIG. 6 shows an example diagram representing a plot of the loss in a cable network versus operational frequency, in accordance with example embodiments of the disclosure. In particular, FIG. 6 shows a diagram 600 of a plot of loss in units of decibels (dB) on the y-axis 602 versus operational frequency in units of Hertz on the x-axis 604. In particular, curve 606 may represent the loss of a first signal at a first power spectral density (PSD) as the signal propagates on a section of coaxial fiber over a cable network, as shown and described in connection with FIG. 4, above. In some embodiments, curve 607 may represent the loss of a second signal at a second PSD as the signal propagates on a section of coaxial fiber over a cable network, where the second PSD is less than the first PSD. Since each bit or symbol of the second signal has more power than each bit of the first signal, at certain frequency ranges the loss of the second signal may be less than the loss of the first signal for the same frequency. Accordingly, curve 607 is shown to be flatter with respect to the loss in dB as compared with curve 606.

In particular, diagram 600 shows an example where at approximately 1 GHz the first signal and second signal may both have a loss of approximately 22 dB; however, at approximately 3 GHz the first signal may have a loss of approximately 45 dB, while the second signal may have a loss that is less than approximately 45 dB, for example, approximately 40 dB or less. As noted, this may be due to the fact that, in this particular example, the second signal may be bitloaded (e.g., differentially transmitting the number of bits that can be transmitted on given subcarriers) at frequencies greater than approximately 1 GHz and therefore the second signal does not need to be amplified as strongly as the first signal for frequencies greater than approximately 1 GHz. Further, the first signal may have a first quadrature amplitude modulation (QAM) modulation rate (for example, a 1024 QAM modulation rate), while the second signal may have a second QAM modulation rate that is less than the first QAM rate (for example, a 512 QAM modulation rate). Accordingly, since the second signal undergoes lower loss in transmission over a similar distance as compared with the first signal, the second signal may be transmitted at a lower power level and reducing the need for amplification.

FIG. 7 shows an example schematic diagram of a plot of power spectral density (PSD) of subcarriers used in transmissions by devices over a network, in accordance with example embodiments of the disclosure. In particular, the devices may include any suitable device, such as devices shown and described in connection with FIG. 4, above. In an embodiment, FIG. 7 shows a diagram 701 of a plot of power spectral density (PSD) of subcarriers used in transmissions by devices over the network, in accordance with example embodiments of the disclosure. In an embodiment, diagram 701 depicts the PSD 702 plotted against frequency 704, and further shows example subcarriers 706, 708, and 710 that are modulated using a first modulation technique (for example, a first modulation technique "X," where "X" represents any known modulation technique), to transmit data and information over the network, for example, from a transmitting device such as a headend to a receiving device such as a cable modem over a cable network. In an embodiment, for transmissions over the network, various types of modulation and encoding schemes and methods can be used. For example, in an embodiment, a single carrier (SC) QAM technique may be used. In an embodiment, in transmissions including the example SC QAM transmissions, the subcarriers 706, 708, and/or 710 can have a predetermined frequency bandwidth 712. In an embodiment, the predetermined frequency bandwidth 712 can be approximately 6 MHz. In an embodiment, the subcarriers can be modulated using OFMD for transmissions over the network. For example, the subcarriers 706, 708, and/or 710 can have a bandwidth 712 of, for example, approximately 50 KHz. In an embodiment, for the SC QAM case, the subcarriers 706, 708, and/or 710 may use the same modulation scheme, for example, modulation type "X".

In various aspects, a processing component (not shown) may be configured to operate on one or more devices (e.g., device 404 which may include a CMTS, or other devices on the network) may include aspects of the functionality of the management computing entity 100, as shown and described in connection with FIGS. 1-2, above. In particular, the one or more devices may include or be in communication with one or more processing elements 205, memory 210, volatile memory 215, and may include a communication interface 220 (e.g., to communicate with between each other and with various customer premise equipment such as cable modems).

FIG. 8 shows another an example schematic diagram of a plot of the PSD of subcarriers used in transmissions by devices over the network, in accordance with example embodiments of the disclosure. In particular, the devices may include any suitable device, such as devices shown and described in connection with FIG. 4, above. In an embodiment, diagram 803 depicts the PSD 823 plotted against frequency 825, and further shows example subcarriers 822, 824, 826, 828, 830, 832, 834, 836, and 838 that are modulated using various, different modulation techniques, to transmit data and information over the network, for example, from a transmitting device to a receiving device over a cable network.

In an embodiment, for transmission over the cable network using OFDM and that make use of discreet receiving devices, the subcarriers 822, 824, 826, 828, 830, 832, 834, 836, and 838 can have different modulations types; for example, a first carrier 822 can have an "X" modulation, a second carrier 824 can have a second modulation "Y," and so on, where "X" and/or "Y" (and the like) can represent any know modulation types. Accordingly, the various subcarriers 822, 824, 826, 828, 830, 832, 834, 836, and 838, having, for example, an approximately 50 KHz bandwidth 840, can use different modulation schemes.

In various aspects, a processing component (not shown) may be further configured to operate on one or more devices (e.g., device 404 which may include a CMTS, or other devices on the network) may include aspects of the functionality of the management computing entity 100, as shown and described in connection with FIGS. 1-2, above. In particular, the one or more devices may include or be in communication with one or more processing elements 205, memory 210, volatile memory 215, and may include a communication interface 220 (e.g., to communicate with between each other and with various customer premise equipment such as cable modems).

FIG. 9 shows an example schematic diagram of a plot of power versus time or frequency for transmissions over a network by devices using NOMA, in accordance with example embodiments of the disclosure. In particular, FIG. 9 shows an example schematic diagram of a plot of power versus time or frequency for transmissions over a network by devices using NOMA in accordance with example embodiments of the disclosure. In particular, diagram 900 shows a plot of the power of a signal on the y-axis 902 versus frequency or time on the x-axis 904. In various embodiments, a signal may be transmitted from a transmitting device to a receiving device using any one of the resource blocks 908, 910, 912, 914, 916 and the like (not shown). In one embodiment, a given resource block (e.g., resource block 908) may correspond to a given power level range for which a transmitting device may transmit the signal to one or more receiving devices over a given frequency range or over a given time. For example, resource block 908 may indicate that the transmitting device may transmit a first signal to a receiving device at a lower power level over a first range of frequencies as compared with transmitting a second signal to a receiving device using the resource block 910 for the same frequency range. Accordingly, the receiving device may be configured to use a power demodulation technique (for example, signal interference cancellation, SIC) to determine a given received signal at a given power level from other received signals at different power levels.

In another embodiment, the devices using NOMA on the cable network may be configured to use a subset of resource blocks (e.g., resource blocks 908 and/or 912) for downstream transmissions, and may be configured to use a different subset of resource blocks (e.g., resource blocks 910 and/or 914) for upstream transmissions. In one embodiment, the frequency range for the x-axis 904 may range from approximately 1 GHz to approximately 3 GHz, as further described in connection with FIG. 10, below.

In an example embodiment, the transmitting device can begin transmitting a signal (for example, a signal including the predetermined sequence described above) at a first data rate, for example at approximately 6 bits per second per hertz (for example, using a 64 QAM modulation), at a first power level in accordance with NOMA. The transmitting device can then determine, as a result of feedback from one or more receiving devices indicative of distortion (e.g., noise, interference, and/or the like) having an associated magnitude below a predetermined threshold, to transmit signals at approximately 12 bits per second per hertz (for example, using 4K QAM), that is, at a higher modulation density, at the first power level or at a second power level in accordance with NOMA. In an embodiment, the transmitting device can transmit a signal (for example, a signal including the predetermined sequence described above) at a first data rate, for example, at approximately 6 bits per second per hertz (for example, using 64 QAM), and then determine, as a result of feedback from one or more receiving devices, that there may be a significant amount of distortion to the signals transmitted. Accordingly, the transmitting device can determine to transmit signals at approximately 4 bits per second per hertz (for example, using 16 QAM), that is, at a lower modulation density, at the first power level, the second power level, or a third power level in accordance with NOMA.

Accordingly, in various embodiments, the transmitting device can, broadly characterized, sequence through operations of sending a signal to a receiving device, receiving a second signal from the receiving device, comparing the transmitted and received signal against internally stored tables, and determining whether to implement a pre-distorted signal having a change in modulation and/or signal power level based on the comparison, and implementing change in modulation and/or power signal power level for a future signal to be sent to receiving device(s), in accordance with a NOMA technique.

In an embodiment the pre-distorted sequences transmitted as signals by the transmitting device and received at the receiving devices can have relatively flat received power versus frequency characteristics. In an embodiment, if the transmitting device determines that the receiving device determined a spike in the noise profile of the channel, the transmitting device may determine to not transmit any data in the frequency range of the noise spike. Accordingly, the transmitting device may determine to transmit no signal in a given frequency band, that is, to employ zero bit loading in an associated frequency band of the noise spike.

In another embodiment, the transmitting device may determine to, alternatively or additionally, pre-distort the signals (e.g., change the modulation and/or the power level of the signals in accordance with a NOMA technique) to be transmitted to the receiving devices and/or to bit-load at least a portion of the signals to be transmitted to the receiving devices. In an embodiment the bit loading of the at least a portion of the signals may be done on a per subcarrier basis. For example, the transmitting device may determine to transmit data at a higher modulation (for example 4K QAM) for a portion of the signal that is at a higher frequency because the transmitting device has determined that the SNR of the received signal at the receiving device may be sufficient support the higher level of modulation. However, the transmitting device may determine to perform bit loading on a portion of the signal that is at lower frequencies, that is, to lower the transmitted power on the portion of the signal at lower frequencies to overcome channel noise and the like.

In an embodiment the transmitting device can transmit the signal indicative of the pre-determined sequence on a per-subcarrier basis, that is, for example, using different modulations for different portions of the signal. In an embodiment the transmitting device can receive feedback signal from the receiving device and using this information, the transmitting device can sequence through the various subcarriers comprising the modulated signal associated with the pre-determined sequence. In an embodiment, the receiving device can send back one or more feedback signals indicative of a deviation from a baseline; that is, when the received signal at the receiving device (indicative of a predetermined sequence) has at least one parameter (for example, SNR, MER, received power, and the like) that is significantly different, for example above or below a given threshold, the receiving device can send back a feedback signal indicative of the deviation. In an embodiment, if, at the receiving device, the received signal indicative of a predetermined sequence has no parameters that exceed a given threshold, the receiving device may determine not to send any feedback signal back to the transmitting device; alternatively or additionally, the receiving device may determine to zero bit-load its feedback to the transmitting device.

In an embodiment, the transmitting device and/or the receiving device can timestamp the signals they send and receive to one another over the network. In an embodiment, the transmitting device can embed the predetermined sequence in every n-th (for example, every $20^{th}$) signal sent to the receiving device. In an embodiment, the transmitting device can embed the predetermined sequence in a header of a date frame associated with every n-th (for example, every $20^{th}$) signal sent to the receiving device.

In an embodiment the threshold for deviation of the received signal from the baseline can be based at least in part on an acceptable operating range. For example, for signals modulated at 4K QAM and transmitted by the transmitting device to the receiving device over the network, the SNR of the received signal at the receiving device may be needed to be approximately 47 dB in order to be received without significant distortion. In an embodiment, for different modulation densities, a different threshold can be determined. Further, for different threshold criteria associated with the deviation of the received signal by the receiving device can be applied to a different portion of the same signal, on a per subcarrier basis. For example, there may be a change of approximately 22 dB on the received power of the signal received at the receiving device when comparing the received power of signal on the lowest frequency as compared with the received power of the signal on the highest frequency. Accordingly, the transmitting device may need to pre-distort (e.g., change the modulation scheme and/or the power level of) the various subcarriers associated with the transmitted signal differently based on the feedback signal received from the receiving device, that is, to pre-distort the signals on a per-subcarrier basis.

In an embodiment, different impairments may occur to a signal sent from the transmitting device to a given receiving device, for example, a given receiving device in a house. For example, the signal can enter into a house and go to a splitter having one leg for TV devices, while another side of the splitter could route the signal to a cable modem. Accordingly, 11 dB attenuation could be obtained on one side of the splitter, but no significant attenuation may be obtained on the other side of the splitter.

In an embodiment, a receiving device (for example, a cable modem in a customer's home) may, as a result of the signaling to the transmitting device (for example, a headend and/or a remote PHY device) determine the level of pre-distortion it needs to apply to upstream signals the receiving device sends through the network to the transmitting device. In such a situation, the steps described above may be performed in reverse, that is, with the receiving device (for example, a cable modem in a customer's home) applying pre-distortion-based feedback received from the normally transmitting device (for example, the headend device and/or remote PHY device).

In an embodiment, burst noise can occur in a non-linear fashion on the network. However, the methods described herein can be performed periodically, for example, every approximately 20 milliseconds to approximately 100 milliseconds; accordingly, the transmitting device and receiving device can still provide optimized signals over the network by avoiding the frequency bands on which the burst noise occurs, on a time averaged basis.

In an embodiment the receiving device can determine the error vector magnitude (EVM) of the received signal comprising a predetermined sequence, in order to determine how far the coordinates of a signal constellation represented by the received signal is from the coordinates of a constellation representing a signal including the predetermined sequence.

In an embodiment, the communication between the transmitting device and the receiving device can include at least initialization, ranging, and registration. In an embodiment initialization can include processes whereby the transmitting device sends information periodically (for example, every 100 milliseconds). In an embodiment the information can include Medium Access Control (MAC) management messages, channel information, and/or timing information, and the like.

In an embodiment the initialization can include processes that can be performed as a part of powering on a receiving device. That is, when the receiving device is turned on, the receiving device can scan and for energy on various bands available to the receiving device. Once the receiving device's tuner finds energy at a given frequency, the receiving device can try to tune into the energy. Accordingly, the receiving device can sequence through various messages, for example, management messages associated with a timer, as a part of synchronization process with the transmitting device. The receiving device can then transmit, at a predetermined time, a signal to the transmitting device indicative of the receiving device's presence on the network. Accordingly, the transmitting device can perform the one or more operation described herein broadly including the transmission of predetermined sequences to the receiving device, on a per subcarrier basis and/or at various power-levels.

After initialization processes and/or as part of an initialization process, the receiving device can transmit a ranging request to the transmitting device to begin the ranging process. As a part of the ranging process, the transmitting device and/or the receiving device can determine what modulation and/or what power-levels to use for a given subcarrier for a given signal to transmit for communication between the transmitting device and the receiving device. In an embodiment, the receiving device and/or the transmitting device can communicate, to each other, a capability matrix indicative of what capabilities the devices have for transmitting and receiving data on the network. For example the receiving device or the transmitting device can indicate that the receiving device and/or the transmitting device are capable of locking into a 192 MHz upstream and 684 MHz downstream data frequency rate at up to approximately 1 GHz of bandwidth, and that the receiving device and/or the transmitting device are capable of communicating at given power levels without degradation to the signals.

Accordingly, after the transmitting device and/or the receiving device what power and modulation scheme to use, the receiving device can perform a registration step to send further data. In an embodiment the registration step can include performing, by the receiving device and/or the transmitting device, one or more secrecy handshakes between the devices, for example, using encryption keys, public encryption, and the like. After finishing the registration phase, the transmitting device and/or the receiving device can communicate and send and receive data. In an embodiment, the ranging can include an initial ranging and a periodic ranging. In an embodiment, the periodic ranging can include various step of the initial ranging (similar to the ranging process described above), but that occurs periodically, for example, approximately every 20, 50, 100 milliseconds.

FIG. 10 shows a diagram representing a spectrum usage for devices on a cable network, in accordance with example embodiments of the disclosure. FIG. 10 shows diagrams of example spectra used in connection with the cable networks and devices described herein, in accordance with example embodiments of the disclosure. In particular, in diagram 1000, the frequency represented by the horizontal axis can go from approximately 5 MHz to approximately 3 GHz.

In some embodiments, diagram 1000 can represent a node-x (that is, a node having a variable number of splits) frequency band allocation scheme. In another embodiment, diagram 1000 can represent an approximately 5 MHz to approximately 204 MHz return, and an approximately 1.0 GHz to approximately 1.2 GHz forward. In another embodiment, legacy devices can use an approximately 5 MHz to approximately 85 MHz return. In some embodiments, the legacy forward portion of the spectrum in diagram 1001 can start at approximately 258 MHz.

In some embodiments, the spectrum represented in diagram 1000 can be partitioned into different portions. A legacy upstream portion 1002 can exist from approximately 5 MHz to approximately 42 MHz. This region can be used for DOCSIS 3.0 (and earlier) enabled devices using single carrier quadrature amplitude modulation (SC-QAM). In another embodiment, the legacy upstream portion 1002 can use time division multiple access (TDMA).

In some embodiments, the portion of the spectrum from approximately 42 MHz to approximately 85 MHz can represent a portion of the spectrum 1004 implementing DOCSIS 3.1 enabled devices and using orthogonal frequency-division multiple access (OFDMA). In some embodiments, the portion of the spectrum 1004 can be used for upstream communication.

The portion of the spectrum from approximately 85 MHz to approximately 108 MHz can represent a portion of the spectrum 1006 that may not be used for network communications, for example, because of the way some cable modems and/or other electronic devices are designed. This can have to do with various factors, for example, device roll-off considerations and other electronic device constraints.

In some embodiments, the portion of the spectrum from approximately 108 MHz to approximately 204 MHz can represent a portion of the spectrum 1008 which can be designated for full-duplex (FDX) transmissions in both the upstream and the downstream for FDX-enabled devices. In some aspects (not shown), the portion of the spectrum designated for FDX transmission can extent to approximately 684 MHz, for example, because silicon analog-to-digital converters (ADCs) may be able to handle 12-bit analog-to-digital (ADC) conversion. Then the portion of the spectrum ending wherever the FDX portion ends (either approximately 204 MHz or approximately 684 MHz) to approximately 1 GHz can be reserved as a portion of the spectrum 1010 for communication comprising legacy downstream, single carrier QAM, DOCSIS 3.0 and earlier, and OFDM for DOCSIS 3.1.

In some embodiments, the portion of the spectrum 1012 over approximately 1 GHz to approximately 1.2 GHz can be used for OFDM DOCSIS 3.1, since DOCSIS 3.0 devices or earlier may not be able to tune into 1 GHz or greater portions of the spectrum.

In another embodiment, the region of the spectrum from approximately 204 MHz to approximately 258 MHz can represent a portion of the spectrum representing an amplifier diplex filter roll-off region. Then the portion of the spectrum from approximately 258 MHz to approximately 1 GHz can be reserved as a portion of the spectrum for legacy downstream communication including single carrier QAM (SC-QAM), DOCSIS 3.0 and earlier, and OFDM for DOCSIS 3.1. In some embodiments, the portion of the spectrum over approximately 1 GHz to approximately 1.2 GHz can be used for OFDM DOCSIS 3.1, since DOCSIS 3.0 devices or earlier may not be able to tune into 1 GHz or greater portions of the spectrum. In some embodiments, the portion of the spectrum 1014 over approximately 1 GHz to approximately 3.0 GHz can be used for transmissions using the NOMA technique. Further, the portion of the spectrum 1014 may be subdivided into a first portion from approximately 1 GHz to approximately 2 GHz, which may be reserved for upstream communication using the NOMA technique. Further, the portion of the spectrum 1014 may be subdivided into a second portion form approximately 2 GHz to approximately 3 GHz, which may be reserved for downstream communication using the NOMA technique. In alternative embodiments, the first portion from approximately 1 GHz to approximately 2 GHz may be used for downstream communication and the second portion from approximately 2 GHz to approximately 3 GHz may be used for upstream communication.

FIG. 11 shows a flow chart illustrating example operations that may be performed by one or more devices described in connection with the disclosed system, in accordance with various embodiments of the disclosure.

At block 1102, a content component may determine a signal for transmission to a receiving device. In another embodiment, the determination of the signal for transmission may be, for example, based on a user input to the device, a predetermined schedule of data transmissions on the network, changes in network conditions, and the like. In one embodiment, the signal may include that data may be encapsulated in a data frame that is configured to be sent from a device to one or more devices on the network.

At block 1104, a processing component may determine parameters associated with the transmission of the signal, the parameters comprising at least one of a power level, a modulation scheme, a frequency band, and a power spectral density. In another embodiment, the power level may include a first power level associated with an upstream communication and a second power level associated with a downstream communication. In one embodiment, the device determines a sensitivity of the receiving device, and wherein the power level is determined based on the sensitivity. In another embodiment, the power spectral density is based at least in part on a sensitivity of the receiving device. In one embodiment, the power spectral density may include a first power spectral density associated with data having a first latency requirement, and the power spectral density may include a second power spectral density associated with data having a second latency requirement greater than the first latency requirement, the first power spectral density being lower than the second power spectral density.

In one embodiment, the frequency band is used for a full-duplex communication, and the frequency band is between approximately 1 GHz and approximately 3 GHz. In another embodiment, the frequency band comprises a first frequency band from approximately 1 GHz to approximately 2 GHz and is used for an upstream communication, and a second frequency band from approximately 2 GHz and approximately 3 GHz and is used for a downstream communication.

At block 1106, a transmitting component may transmit the signal over a medium based on the parameters and using a non-orthogonal multiple access (NOMA) technique. In one embodiment, the medium may include a coaxial cable. In one embodiment, the signal including the data may be sent at a predetermined time based at least in part on a predetermined schedule of communication between the devices of the network. In another embodiment, a first signal including first data may be first sent by the device, a period of time may elapse, and the device may repeat some or all of the procedures described in connection with any one or more of the previous blocks and resend a second signal including second data.

FIG. 12 shows another flow chart illustrating additional example operations that may be performed by one or more devices described in connection with the disclosed system, in accordance with various embodiments of the disclosure.

At block 1202, a receiving component may receive a first signal from a transmitting device. In another embodiment, the reception of the first signal may be, for example, based on a user input to the device, a predetermined schedule of data transmissions on the network, changes in network conditions, and the like. In one embodiment, the first signal may include that data may be encapsulated in a data frame that is configured for transmission between one or more devices on the network.

At block 1204, a processing component may determine parameters based on the first signal, the parameters comprising at least one of a power level, a modulation scheme, a frequency band, and a power spectral density. In one embodiment, the power spectral density comprises a first power spectral density associated with data having a first latency requirement, and the power spectral density comprises a second power spectral density associated with data having a second latency requirement greater than the first latency requirement, the first power spectral density being lower than the second power spectral density. In another embodiment, the frequency band is used for a full-duplex communication, and the frequency band is between approximately 1 GHz and approximately 3 GHz. In one embodiment, the frequency band comprises a first frequency band from approximately 1 GHz to approximately 2 GHz and is used for an upstream communication, and a second frequency band from approximately 2 GHz and approximately 3 GHz and is used for a downstream communication.

At block 1206, the receiving component may receive a second signal over a medium using a NOMA technique and using the parameters. In one embodiment, the medium comprises a coaxial cable. In one embodiment, the second signal including the data may be received at a predetermined time based at least in part on a predetermined schedule of communication between the devices of the network. In another embodiment, the second signal including first data may be first received by the device, a period of time may elapse, and the device may repeat some or all of the procedures described in connection with any one or more of the previous blocks, and a third signal including additional data may be received by the receiving component using the NOMA technique and/or the parameters.

In various embodiments, to extract a given signal (e.g., the first signal or the second signal) from the total signal received by the receiving device, one or more technique such as SIC may be used by the receiving device. In particular, using the SIC technique, the receiving device may first decode the signal in the received transmission that is the strongest one while treating other signals in the transmission as interference and/or noise. In another embodiment, the first decoded signal may then be subtracted from the received signal and, if the decoding is determined to be greater than in quality than a predetermined threshold, the residual signal (e.g., the signal including the rest of the signals) is accurately obtained. In one embodiment, the SIC technique may be iteratively applied by the receiving device until the receiving device determines the signal that was intended for it (as opposed to other signals in the transmission intended for other devices on the network).

In various aspects, as noted, the processing component, the transmitting component, and/or the receiving component (not shown) may be configured to operate on one or more devices (e.g., device 404 which may include a CMTS, another network controller device further upstream on the network, and/or other devices further downstream on the network) may include aspects of the functionality of the management computing entity 100, as shown and described in connection with FIGS. 1-2, above. In particular, the processing component, the transmitting component, and/or the receiving component may be configured to be in communication with one or more processing elements 205, memory 210, volatile memory 215, and may include a communication interface 220 (e.g., to facilitate communication between devices, for example, with various customer premise equipment such as cable modems).

Moreover, the processing component, the transmitting component, and/or the receiving component (not shown) may be configured to operate on one or more devices that may be further configured to transmit data packets to customer premise equipment, which may include devices that include aspects of the functionality of the user device 110, as further shown and described in connection with FIG. 3, above. For example, customer premise equipment may include a device having a transmitter 304, a receiver 306, and/or a network interface (e.g., to communicate with an access point or other device to receive information from the fiber node 414 or similar device). Moreover, the customer premise equipment may include a device having volatile memory 322 and/or non-volatile memory 324 in addition to a processor (e.g., to perform one or more computational tasks, such as processing received signals, etc.). Further, the customer premise equipment may include a display 316 and/or a keypad 318 (e.g., for interacting with a user or operator).

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example an FPGA (field programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an implementation of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (for example the Internet), and peer-to-peer networks (for example ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example an HTML page) to a client device (for example for purposes of displaying information/data to and receiving user input from a user interacting with the client device). Information/data generated at the client device (for example a result of the user interaction) can be received from the client device at the server.

While this specification contains many specific implementation details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying FIGS. do not necessarily require the particular order shown, or sequential order, to achieve desirable results. In certain implementations, multitasking and parallel processing may be advantageous.

V. CONCLUSION

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A device comprising memory and processing circuitry, the device comprising processing circuitry configured to:
   determine a non-orthogonal multiple access (NOMA) technique associated with a transmission of a first signal to a receiving device using a frequency band at a first time, wherein the first signal is non-orthogonal to a second signal transmitted using the frequency band at the first time;
   determine a signal-to-noise ratio for a third signal to be sent using the receiving device;
   determine a magnitude of the first signal, wherein the magnitude is associated with causing the third signal to have the signal-to-noise ratio;
   determine, based on the magnitude, a sensitivity of the receiving device;
   generate the first signal;
   determine, based on the NOMA technique and the sensitivity of the receiving device, a power spectral density associated with transmitting the first signal; and
   transmit the first signal using the frequency band at the first time based on the power spectral density.

2. The device of claim 1, wherein the first signal comprises Internet Protocol (IP) data, and wherein the frequency band is associated with a data over cable service interface specification (DOCSIS) network.

3. The device of claim 1, further comprising:
   determining first parameters associated with the transmission of the first signal, the first parameters comprising a power level, and wherein the power level is associated with an upstream Internet Protocol (IP) communication using a DOCSIS network.

4. The device of claim 3, wherein the first parameters are different from second parameters associated with transmission of the third signal.

5. The device of claim 1, wherein the power spectral density comprises a first power spectral density associated with data having a first latency requirement, and the power spectral density comprises a second power spectral density associated with data having a second latency requirement greater than the first latency requirement, the first power spectral density being lower than the second power spectral density.

6. The device of claim 1, wherein the frequency band is used for a full-duplex communication using a DOCSIS network, and the frequency band is between approximately 1 GHz and approximately 3 GHz.

7. The device of claim 1, wherein the frequency band comprises a first frequency band from approximately 1 GHz to approximately 2 GHz and is used for an upstream communication, and a second frequency band from approximately 2 GHz and approximately 3 GHz and is used for a downstream communication.

8. A device comprising memory and processing circuitry, the processing circuitry configured to:
  receive a first signal received from a transmitting device using a frequency band and a non-orthogonal multiple access (NOMA) technique;
  determine a magnitude of the first signal, wherein the magnitude is associated with a sensitivity of the device and is based on a signal-to-noise ratio associated with a second signal to be transmitted by the device;
  determine, based on the magnitude, the signal-to-noise ratio;
  determine, based on the NOMA technique and the signal-to-noise ratio, a power spectral density associated with transmitting the second signal; and
  send the second signal using the frequency band and the power spectral density.

9. The device of claim 8, wherein the first signal comprises Internet Protocol (IP) data, and wherein the frequency band is associated with a data over cable service interface specification (DOCSIS) network.

10. The device of claim 8, wherein the power spectral density comprises a second power spectral density associated with data having a first latency requirement, and the power spectral density comprises a third power spectral density associated with data having a second latency requirement greater than the first latency requirement, the second power spectral density being lower than the third power spectral density.

11. The device of claim 8, wherein the frequency band is used for a full-duplex communication using a DOCSIS network, and the frequency band is between approximately 1 GHz and approximately 3 GHz.

12. The device of claim 8, wherein the frequency band comprises a first frequency band from approximately 1 GHz to approximately 2 GHz and is used for an upstream communication, and a second frequency band from approximately 2 GHz and approximately 3 GHz and is used for a downstream communication.

13. A method, comprising:
  determining, by a processing component of a device, a non-orthogonal multiple access (NOMA) technique associated with a transmission of a first signal to a receiving device using a frequency band at a first time, wherein the first signal is non-orthogonal to a second signal transmitted using the frequency band at the first time;
  determining a signal-to-noise ratio for a third signal to be sent using the receiving device;
  determining a magnitude of the first signal, wherein the magnitude is associated with causing the third signal to have the signal-to-noise ratio;
  determining, based on the magnitude, a sensitivity of the receiving device;
  generating, by a content component of the device, the first signal;
  determining, by the processing component, based on the NOMA technique and the sensitivity of the receiving device, a power spectral density associated with transmitting the first signal; and
  transmitting, by a transmitting component of the device, the first signal using the frequency band at the first time based on the power spectral density.

14. The method of claim 13, wherein the first signal comprises Internet Protocol (IP) data, and wherein the frequency band is associated with a data over cable service interface specification (DOCSIS) network.

15. The method of claim 13, further comprising:
  determining first parameters associated with the transmission of the first signal, the first parameters comprising a power level, and wherein the power level comprises a first power level associated with an upstream Internet Protocol (IP) communication using a DOCSIS network.

16. The method of claim 15, wherein the first parameters are different from second parameters associated with transmission of the third signal.

17. A system comprising:
  a first device having first memory and first processing circuitry; and
  a second device having second memory and second processing circuitry;
  wherein the first device is configured to:
    determine, by the first processing circuitry, a non-orthogonal multiple access (NOMA) technique associated with a transmission of a first signal to the second device using a frequency band at a first time, wherein the first signal is non-orthogonal to a second signal transmitted using the frequency band at the first time;
    determine a signal-to-noise ratio for a third signal to be sent using the second device;
    determine a magnitude of the first signal, wherein the magnitude is associated with causing the third signal to have the signal-to-noise ratio;
    determine, based on the magnitude, a sensitivity of the second device;
    generate, by the first processing circuitry, the first signal;
    determine, by the first processing circuitry, based on the NOMA technique and the sensitivity of the second device, a power spectral density associated with transmitting the first signal; and
    transmit, by the first processing circuitry, the first signal over a data over cable service interface specification (DOCSIS) network using the frequency band and the power spectral density.

18. The system of claim 17, wherein the first device is further configured to determine first parameters associated with the transmission of the first signal, wherein the first parameters are different than second parameters associated with the third signal.

19. The system of claim 17, wherein the first signal comprises Internet Protocol (IP) data.

20. The system of claim 17, wherein the frequency band is used for a full-duplex communication using a DOCSIS network, and the frequency band is between approximately 1 GHz and approximately 3 GHz.

* * * * *